UNITED STATES PATENT OFFICE 2,312,743

ALKOXY META-DIOXANES

Erving Arundale, Union, and Louis A. Mikeska, Westfield, N. J., assignors to Standard Oil Development Company, a corporation of Delaware No Drawing. Application December 1, 1939, Serial No. 307,112

8 Claims. (Cl. 260—338)

This invention relates to a process for the conversion of unsaturated oxygen-containing compounds into substituted meta-dioxanes, i. e., substituted unsymmetrical cyclic diethers, which are novel compounds. The ordinary meta-dioxanes or unsymmetrical cyclic diethers are organic compounds containing a six-membered ring composed of four carbon atoms and two oxygen atoms in which the two oxygen atoms are attached to the same carbon atom. They have the general formula—

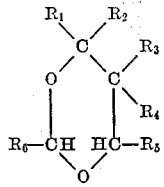

where $R_1$, $R_2$, $R_3$, $R_4$, $R_5$, and $R_6$ are hydrogen, alkyl, aryl, aralkyl or alkaryl radicals, e. g., methyl, ethyl, butyl, phenyl, benzyl, tolyl, and the like. Compounds made according to this invention have the same nuclear ring structure shown above except that $R_1$ or $R_4$ is replaced by an alkoxy, or an aliphatic radical containing oxygen in the form of an alkoxy group.

According to the present invention, unsaturated aliphatic compounds containing an oxygen atom and an olefinic linkage are reacted with an aldehyde in the presence of an acidic catalyst to yield substituted metadioxanes. This invention contemplates employing as a starting material any unsaturated organic compound containing oxygen in the form of an alkoxy group. Such unsaturated compounds include unsaturated ethers, such as vinyl methyl ether, allyl ethyl ether, which are tertiary acyclic olefinic ethers having the grouping

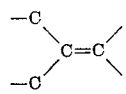

in their molecule and homologues thereof. The aldehyde may be formaldehyde, acetaldehyde, or a compound, such as trioxymethylene and paraldehyde, which decomposes to yield an aldehyde.

The term "acidic catalyst" is meant to include solutions having a concentration of between 5% and 90% of acids, such as sulfuric, sulfurous, phosphoric, phosphorous, fluorsulfonic, fluosilicic, dihydroxy-fluoboric or hydrofluoboric acid, or acid-acting metallic salts, such as sodium hydrogen sulfate, sodium dihydrogen phosphate, zinc sulfate, ferric sulfate, aluminum sulfate, and the like. The reaction usually proceeds at atmospheric pressure and room temperature, but the use of higher temperatures materially increases the rate of reaction. Since the reaction is exothermic, some means of cooling may be provided to dissipate the heat of reaction. The molar ratio of unsaturated oxygen-containing compound to aldehyde should be at least 1:2 but is preferably at least 1.5:2.

The products of these reactions are usually liquids having a specific gravity less than 1. They boil above 100° C., and are usually somewhat water-soluble. The most probable general formula for these compounds is:

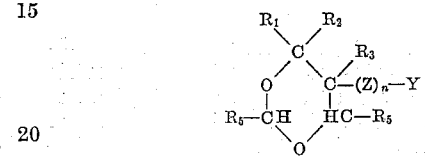

wherein $R_1$, $R_2$, $R_3$, and $R_5$ may be either hydrogen, alkyl, or substituted derivatives thereof, e. g., $CH_3-$, $ClCH_2-$, $CH_3OCH_2-$, etc.; Z is a bivalent hydrocarbon radical, e. g.—

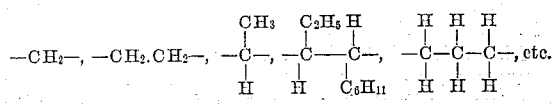

$n$ is zero or one; and Y is an alkoxy group, e. g., $-OCH_3$, etc. These products are useful as solvents, blending agents for motor fuels, and as intermediates for further chemical reactions.

In the above formula, the atoms forming the six-membered rings are numbered, for the purposes of nomenclature, from 1 to 6 inclusive, starting with the oxygen atom situated between the two carbon atoms to which are attached the $R_5$ substituents as No. 1 and proceeding in a clockwise direction.

Representative compounds obtainable according to this invention are 4,4-dimethyl-5-ethoxymethyl meta-dioxane, from dimethallyl ethyl ether and formaldehyde, 5-methyl-5-ethoxymethyl meta-dioxane, from isobutenyl ethyl ether and formaldehyde.

The following example is given for the purpose of illustrating the process of this invention.

Example 228 parts of dimethallyl ethyl ether,

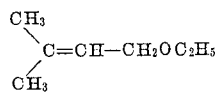

90 parts of paraformaldehyde, and 90 parts of 25% sulfuric acid were placed in a closed container. The mixture was shaken for 22 hours, at the end of which time the formaldehyde had all reacted, and the reaction mixture was present in two layers. The mixture was neutralized with potassium carbonate. The lower or aqueous layer, including the salts, was then removed. Any of the product present in this layer may be extracted therefrom with ether. The upper layer (315 parts) was then dried over anhydrous potassium carbonate. The crude product, after the removal of the drying agent, was purified by vacuum distillation. (Boiling range, 75–85° C. at 1 mm.)

The above disclosure and example are given for the purpose of illustration only and are not to be considered as in any way limiting the invention.

What is claimed is:

1. The method of producing a substituted meta-dioxane which comprises reacting one mol of dimethallyl ethyl ether with two mols of a saturated aldehyde in the presence of a dilute acid-reacting catalyst.

2. The method of producing a substituted meta-dioxane which comprises reacting one mol of dimethallyl ethyl ether with two mols of formaldehyde in the presence of a dilute acid-reacting catalyst.

3. The method of producing a substituted meta-dioxane which comprises condensing one mol of dimethallyl ethyl ether with two mols of formaldehyde in the presence of dilute sulfuric acid.

4. The method of producing 4,4-dimethyl-5-ethoxy-methyl meta-dioxane which comprises condensing one mol of dimethallyl ethyl ether with two mols of formaldehyde in the presence of dilute sulfuric acid, and recovering the 4,4-dimethyl-5-ethoxy-methyl meta-dioxane.

5. The method of producing 4,4-dimethyl-5-ethoxy-methyl meta-dioxane which comprises agitating and reacting dimethallyl ethyl ether with formaldehyde, said reactants being present in a molar ratio of at least 1:2, in the presence of 15–35% sulfuric acid at atmospheric temperature and at the pressure generated by the reaction, neutralizing the reaction mixture, discontinuing agitation and permitting the mixture to stratify, removing the lower aqueous layer, and recovering the 4,4-dimethyl-5-ethoxy-methyl meta-dioxane from the upper layer by vacuum distillation.

6. As a composition of matter, 4,4-dimethyl-5-ethoxy-methyl meta-dioxane.

7. The method of producing an acyclically substitued meta-dioxane of the type

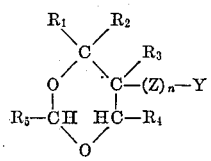

which comprises reacting one mol of a tertiary acyclic olefinic ether of the formula

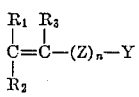

with two mols of a saturated aldehyde in the presence of a dilute acid-reacting catalyst, wherein $R_1$ and $R_2$ are alkyl hydrocarbon radicals; $R_3$ is selected from the group consisting of hydrogen and alkyl hydrocarbon radicals; $R_4$ and $R_5$ are identical radicals selected from the group consisting of hydrogen and alkyl hydrocarbon radicals; Z is a bivalent saturated hydrocarbon radical; $n$ is chosen from the group consisting of 0 and 1; and Y is an alkoxy group.

8. As a composition of matter an acyclically substituted meta-dioxane of the general formula

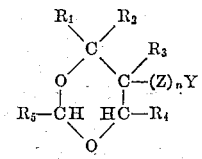

where $R_1$ and $R_2$ are alkyl hydrocarbon radicals; $R_3$ is a radical selected from the group consisting of hydrogen and alkyl hydrocarbon radicals; $R_4$ and $R_5$ are identical substituents selected from the group consisting of hydrogen and alkyl hydrocarbon radicals; Z is a bivalent saturated hydrocarbon radical; $n$ is chosen from the group consisting of 0 and 1 and Y is an alkoxy group.

ERVING ARUNDALE.
LOUIS A. MIKESKA.